United States Patent [19]

Jones

[11] 4,241,431

[45] Dec. 23, 1980

[54] SONAR RANGING SYSTEM

[75] Inventor: Charles H. Jones, Murrysville, Pa.

[73] Assignee: The United States of America as represented by the Secretary of the Navy, Washington, D.C.

[21] Appl. No.: 678,488

[22] Filed: Oct. 24, 1967

[51] Int. Cl.³ .............................................. G01S 3/80
[52] U.S. Cl. .................................... 367/123; 367/126
[58] Field of Search ...................... 340/6, 16; 367/118, 367/119, 123, 126

[56] References Cited

U.S. PATENT DOCUMENTS 2,897,351  7/1959  Melton ................................... 340/6

FOREIGN PATENT DOCUMENTS 1422061  11/1965  France ..................................... 340/6

Primary Examiner—Richard A. Farley
Attorney, Agent, or Firm—R. S. Sciascia; L. I. Shrago

[57] ABSTRACT

A passive ranging system is disclosed wherein the transducer array has its beam pattern modulated so as to match the arrival angles of the different wave fronts arriving at the array from various target distances. The beams are formed by orientating a multiplicity of readout arms at appropriate angles with respect to a recording medium which has the individual signals detected by each transducer of the array recorded thereon in different horizontal tracks. The readout arms thus simultaneously scan all of the signals associated with the arrival angles for a particular range and produce a signal whose amplitude is a measure of the probability of a target at this range.

9 Claims, 4 Drawing Figures

LOCUS OF PEAK INTENSITIES

SONAR RANGING SYSTEM

The invention described herein may be manufactured and used by or for the Government of the United States of America for governmental purposes without the payment of any royalties thereon or therefor.

The present invention relates generally to a passive underwater sound detecting system capable of determining targets at extreme distances and, more particularly, to an arrangement wherein directional beams shaped to correspond to the expected angles of arrival of a sound signal from different ranges are scanned to produce a signal indicative of the probability of a target at each particular range.

One conventional technique for detecting underwater targets at remote distances is to form a set of uniformly spaced, directional beams by means of delay lines and to feed the signal information from each beam to a bank of narrow band filters. The output from each filter is detected and recorded, and the resulting recording obtained from the parallel channels yields a plot of vertical angle versus amplitude. To determine target range from this plot requires a skilled operator or a complex digital or analog data processing unit. Moreover, such an approach involves an excessively large number of delay networks, switching circuits, filters, amplifiers and detectors. Also, even after such a display of vertical angle versus amplitude is obtained, it is difficult to determine just what the most probable target range is.

From recent experimental evidence, it appears that there is a characteristic set of arrival angles associated with every target range. Thus, instead of utilizing a multiplicity of uniformly spaced beams and sweeping these beams through a search cycle, the present invention shapes the beam to correspond to the expected angles of arrival for a particular range, and this pattern is swept in such a way as to match the expected pattern for each range. In this manner, a single signal is obtained which is a measure of the probability of the target at each particular range. Stated somewhat differently, the receiving pattern of the transducer array is continuously modulated so as to correspond to the expected pattern for each target range between the minimum and maximum value.

It is accordingly a primary object of the present invention to provide a passive underwater ranging system which can determine target ranges out to approximately one hundred miles.

Another object of the present invention is to provide a novel technique for processing signals from a vertical transducer array which produces at any given time a signal indicative of the probability of a target at a particular range.

Another object of the present invention is to provide a sonar system which searches target range as a function of time.

A still further object of the present invention is to provide a method for shaping the beam pattern of a vertical, linear array of acoustic transducers so that at any given time it corresponds to the expected angles of arrival of signals from a particular target range.

Other objects, advantages and novel features of the invention will become apparent from the following detailed description of the invention when considered in conjunction with the accompanying drawings wherein.

Figure 1:
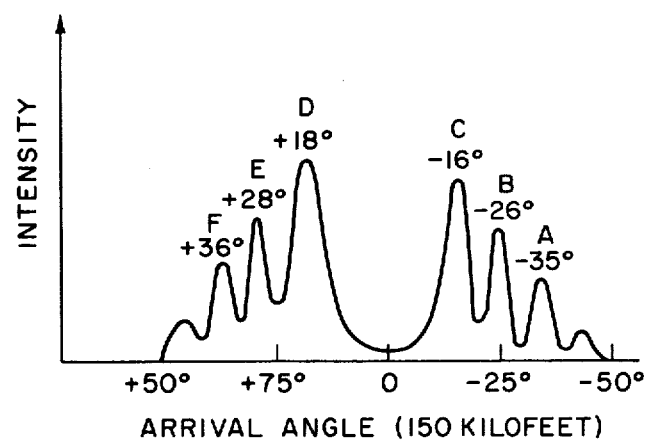
FIG. 1 is a plot of signal intensity versus arrival angle for a target located a predetermined distance from a receiving site.

As alluded to hereinbefore, there is experimental evidence which indicates that there is a characteristic set of angles for the various wave fronts originating at underwater radiating sources which are located at specific distances from an arrival location. For example, as illustrated in FIG. 1, a radiating source at a 150-kilofoot range from a reference site may be identified with eight specific arrival angles, the most prominent of which are $-35°$, $-26°$, $-16°$, $+18°$, $+28°$ and $+36°$, as measured from the horizontal. To search this particular range to determine whether there is a target present, the present invention controls the receiving array so that it has directional beam characteristics at each of these eight angles. The amplitude of the signal produced by the array is therefore an indication of the probability of a target at this specific range.

Figure 2:
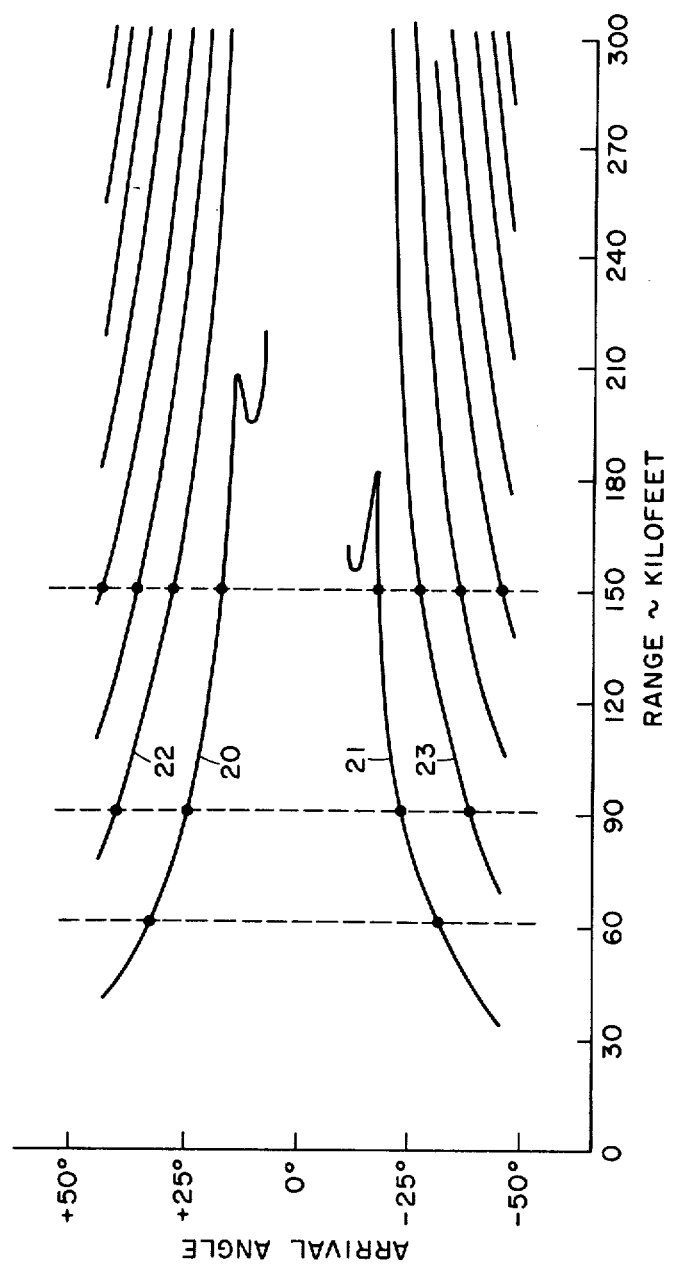
FIG. 2 is a plot of arrival angle versus target range for peak signal intensities.

In order to scan a complete range of target distances, it will be appreciated, the array must continuously change the number of its beams and their directions to conform to the various arrival angles associated with these ranges. As shown in FIG. 2, which is a plot showing the locus of peak intensities for different target ranges versus arrival angles at a 3,000-foot depth, it will be seen that to search the 60-kilofoot range the transducer array must be phased to produce a directional pattern having two lobes at the $+32°$ and $-30°$ angle. However, to scan the 90-kilofoot range, four lobes or directional beams must be present at approximately $+25°$, $-25°$, $+40°$ and $-40°$. Likewise, to search the 150-kilofoot range, the receiving array must be phased to form eight directional beams to correspond to the eight arrival angles identified in FIG. 1. It will be appreciated that a change in the location of the transducer array from the 3,000-foot depth mentioned above or a change in the bottom elevation will yield another family of curves similar to those depicted in FIG. 2.

It will, therefore, be seen that the ranging operation starts with two beams, adds two more, then another two, and finally employs eight different beams. As the range increases, the first two beams slowly move toward smaller arrival angles, following curves 20 and 21 of FIG. 2. Likewise, when the third and fourth beams are introduced around the 70-kilofoot range, these beams, too, slowly move towards smaller and smaller arrival angles, following curves 22 and 23. All other beams which are formed as the range further increases duplicate this general movement as the various curves in FIG. 2 show.

Figure 4:
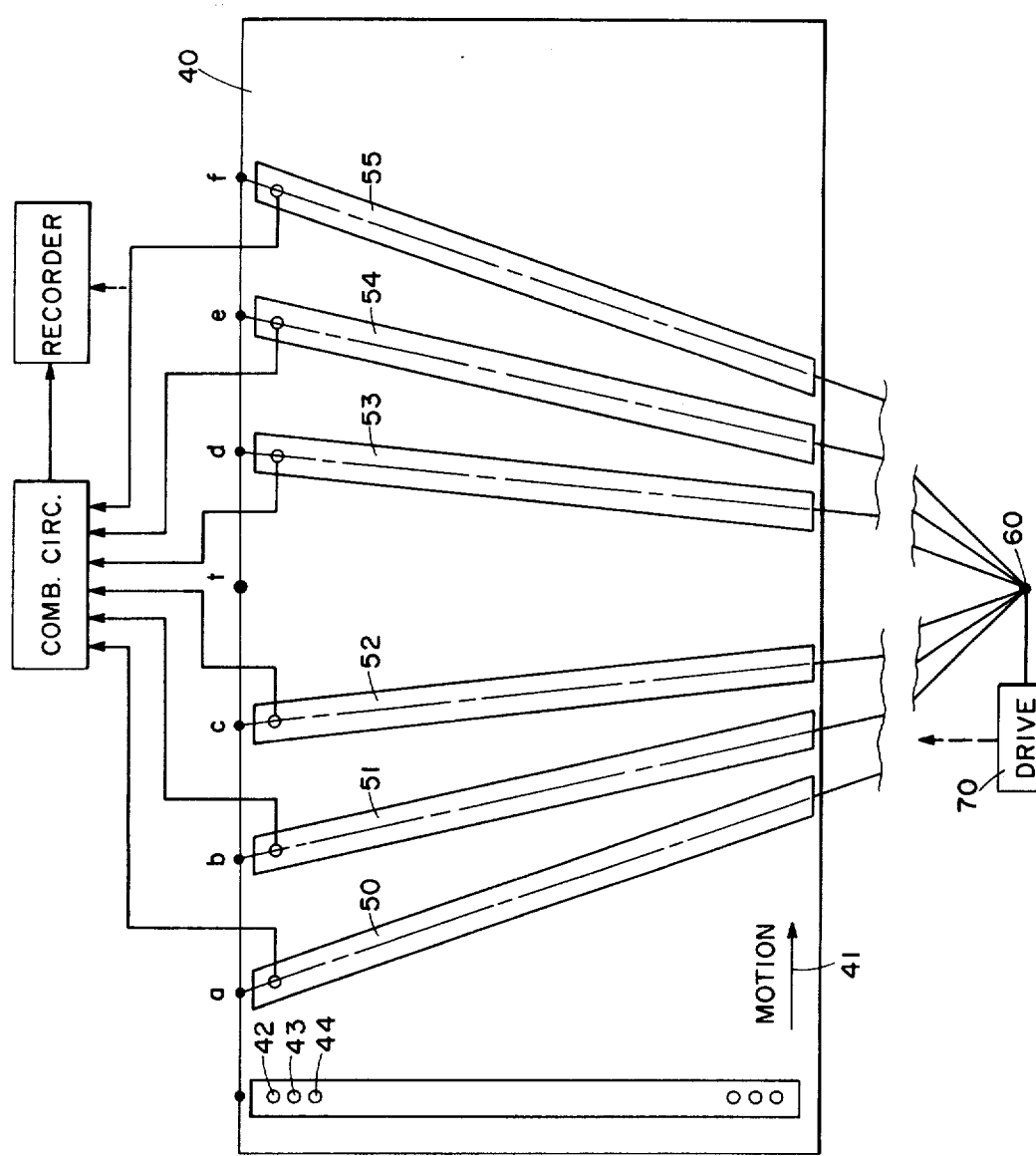
FIG. 4 shows an arrangement for forming the beams in order to obtain the receiving patterns required.

An arrangement such as that shown in FIG. 4 may be employed to obtain the desired receiving pattern. Here, a broad strip of endless, magnetic tape 40 is moved at a constant speed in the direction shown by arrow 41 across a suitable flat surface, not shown. A multiplicity of recording heads, such as elements 42, 43, etc., are placed in a line at right angles to the direction of tape travel. There is one recording head for each transducer in the vertical array used as the detecting apparatus of the ranging system. The spacing between these heads is proportional to the spacing between adjacent transducer elements in the vertical receiving array.

The signal derived from each transducer is amplified and then fed to its corresponding recording head 42, 43, etc. Thus, the output signal from each transducer is recorded as a different horizontal track across magnetic tape 40.

To form, for example, six beams for examining a similar number of arrival angles, six relatively long readout transducers 50, 51, 52, 53, 54, 55 are arranged to extend across the width of the magnetic tape so as to scan all of the horizontal tracks recorded thereon. These transducers are pivotally connected at point 60. This connection permits the transducers to be set at various angular orientations with respect to one another and with respect to the direction of tape travel. It will be understood that if eight beams are to be examined, two more long transducers must be added to the system since there must be one readout transducer for each arrival angle being inspected. The pivot point for each transducer may be at any convenient location, provided the transducer makes a proper angle with respect to the tape.

Figure 3:
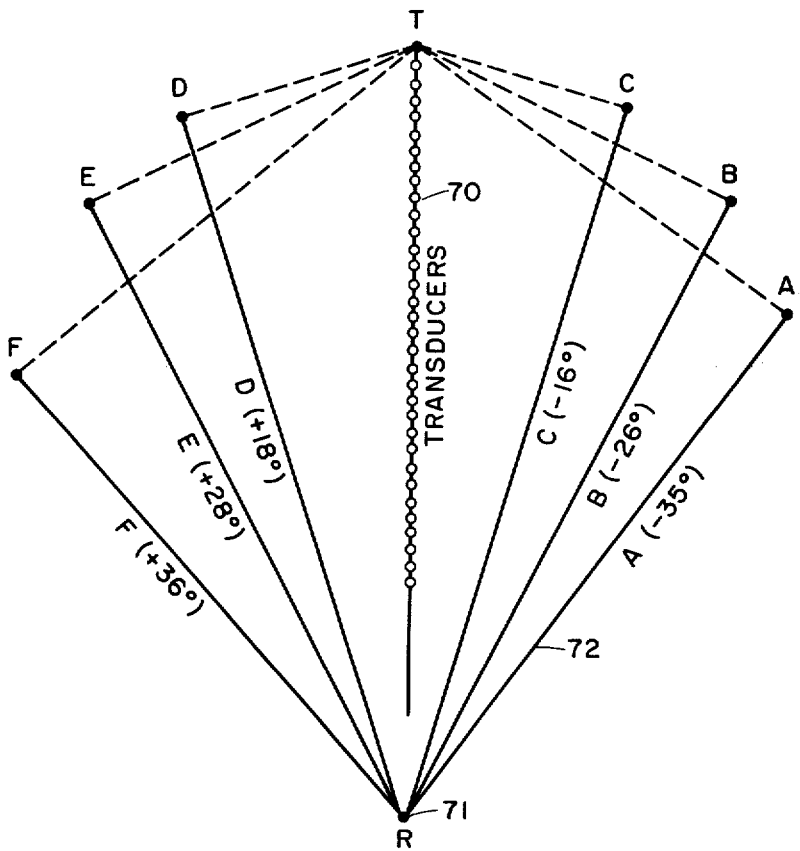
FIG. 3 is a schematic illustration showing the several major wave fronts from a target at a 150,000-foot range.

The operation of the apparatus of FIG. 4 and the manner in which it searches for targets at the 150-kilofoot range may, perhaps, best be understood by considering FIG. 3. In this schematic showing, the receiving array corresponds to the vertical line 70 interconnecting a multiplicity of equally spaced circles representing the individual transducers. Six of the eight principal wave fronts, A, B, C, D, E, F, identified in FIG. 1, are shown in this figure at the instant in time all of them pass through a reference point 71 located below the transducers. The time elapsed, before wave front A which is at the $-30°$ angle reaches the reference point T, is proportional to the perpendicular distance AT. Similarly, the time elasped, before wave front B which is at the $-26°$ angle reaches this same point, is proportional to BT. And the time elasped, before wave front C which is at the $-16°$ angle reaches this point, is proportional to CT, and so forth. In FIG. 4 the pivotal point 60 corresponds to point 71 in FIG. 3, and point t corresponds to reference point T. The individual readout transducers 50, 51, 52, 53, 54, 55 are set such that the distances from their ends a, b, c, etc., to point t are proportional to the distances AT, BT, CT, etc., respectively. Thus, the delay times associated with these distances at, bt are equal to the delay times associated with the distances AT, BT, CT, etc. Thus, each long transducer is set to readout simultaneously all of the signals recorded on the various horizontal tracks representing each of the six wave fronts.

With the six readout transducers at the angular positions shown in FIG. 4, the signal associated with wave front A in FIG. 3 after it has been received by the transducers of the array, amplified and applied to the recording heads, will therefore be picked up by readout transducer 50. Likewise, the signal associated with wave front B after it has been processed and recorded will be simultaneously picked up by transducer 51. And the same will be true with respect to the four other wave fronts shown in FIG. 3, namely, C, D, E, F, and their readout transducers 52, 53, 54, 55.

The signals obtained from each of the six readout transducers are filtered, detected and then combined in an appropriate ratio. Thereafter, these outputs are recorded as a function of time to yield the desired plot of signal amplitude versus range. By examining this plot, one can readily determine the presence and range of any of the detected targets.

If the array of transducers employed as the detecting apparatus is tilted or curved, this can be corrected by appropriately tilting and curving the array of recording heads. If the velocity gradient in the water causes appreciable wave front curvature, this can be corrected by simply curving the six readout transducer arms.

It will also be appreciated that instead of a magnetic tape a dielectric tape may be used as the recording medium. Of course, if a belt loop is used as the recording device, suitable erase heads extending across the width of the tape must be used to remove the signals before the tape again passes by the recording heads 42, 43, etc.

As mentioned hereinbefore, as the system of FIG. 4 scans greater and greater ranges, all of the readout transducers move toward positions corresponding to smaller arrival angles. This means, in effect, that all of the readout arms must slowly fold up from the fanned out condition shown. This mode of operation simplifies the mechanical drive mechanism 70 needed to control the settings of the readout transducers.

Obviously many modifications and variations of the present invention are possible in the light of the above teachings. It is therefore to be understood that within the scope of the appended claims the invention may be practiced otherwise than as specifically described.

What is claimed is:

1. In a sonar scanning system wherein a vertical array of equally spaced transducers is employed as the detecting means, the combination of
   means for processing the acoustic signals detected by said array to impart to said array a receiving pattern which contains a plurality of directional receiving beams orientated at different angles with respect to the horizontal,
      the number of these beams and their angular orientation changing with time so that there is a beam available for detecting each of the major wave fronts arriving at said array from sound producing objects at progressively greater distances from said array; and
   means for combining the signals developed by these beams to produce a range signal whose amplitude at any one time is indicative of the probability of a sound producing object being at a specific distance from said array.

2. In a sonar scanning system wherein a vertical array of equally spaced transducers is employed as the detecting means, the combination of
   means for generating a separate electrical signal for each of the major sound wave fronts arriving at said array from an underwater sound radiating target which is at a specific distance away from said array; and
   means for combining all of said electrical signals to provide an output signal whose amplitude is indicative of the probability of said sound radiating target being at said specific distance.

3. In a sonar scanning system, the combination of a vertical array of equally spaced sound transducers positioned at a reference site;
   means for processing the sound signals detected by said array so as to produce a plurality of electrical signals, each of which has an amplitude corresponding to the intensity of the different major sound wave fronts arriving at said array from an underwater sound source which is located at a specific distance from said array; and means for combining all of said electrical signals so produced to generate a range signal whose amplitude is indicative of the probability of said underwater sound source being at said specific distance.

4. In a method for scanning for underwater sound producing objects which may be at different distances from a reference site, the steps of forming at said site a plurality of sound receiving beams, each beam being orientated at a different one of the arrival angles of the major sound wave fronts which arrive at said reference site from sound producing objects at progressively greater distances from said site; and combining the signals developed by each of said receiving beams to produce an output signal whose amplitude at any given time is indicative of the probability of a sound producing object at a specific distance from said reference site.

5. In a sonar scanning method, the steps of modulating the receiving pattern of a series of equally spaced transducers which are positioned in a vertical line at a reference site so as to form individual receiving beams orientated at each of the various arrival angles of the major sound wave fronts which would arrive at said reference site from sound producing objects located at progressively greater distances from said reference site; and combining the signals developed by each receiving beam to produce an output signal whose amplitude at any time is indicative of the probability of a sound producing object being at a specific distance from said reference site.

6. In a sonar scanning method, the steps of detecting the major sound wave fronts arriving at a specific reference site from underwater sound producing objects which are at progressively greater distances from said site;

recording the electrical signals produced as a consequence of said detection;

developing from said recorded signals a plurality of output signals, each of said output signals having an amplitude proportional to the intensity of each of said major wave fronts; and combining said output signals to produce a range signal whose amplitude is indicative of the probability of a sound producing object being at a specific distance from said site.

7. In a method for scanning for underwater sound producing objects which may be at various distances from a reference location, the steps of changing the receiving pattern of a transducer array located at said reference location so as to have said pattern include a plurality of separate receiving beams orientated at different angles with respect to the horizontal, the number of beams at any one time corresponding to the number of major sound wave fronts arriving at said reference location from said sound producing objects at given distances from said location, and the angular position of these beams corresponding to the various arrival angles of these major sound wave fronts;

combining the signals developed by each of these receiving beams to produce an output signal; and recording said output signal as a function of time.

8. In an underwater sound detection system, a receiving array consisting of a multiplicity of equally spaced transducers positioned in a vertical line;

means for recording the output signal developed by each of said transducers as a separate horizontal track on a recording medium; the spacing between adjacent horizontal tracks being proportional to the spacing between adjacent transducers of said receiving array;

a multiplicity of readout transducers, each of said readout transducers being capable of reading all of said tracks simultaneously and producing an output signal;

means for adjusting the angular positions of said readout transducers with respect to said horizontal tracks whereby each of said readout heads produces an output signal corresponding to a different arrival angle of the major sound wave fronts arriving at said array from sound producing objects located at different distances from said array; and means for combining each of the output signals produced by said readout heads to develop a range signal.

9. In an arrangement as defined in claim 8, means for recording the variations in amplitude of said range signal as a function of time.

* * * * *